(12) United States Patent
Ge

(10) Patent No.: US 11,559,736 B2
(45) Date of Patent: Jan. 24, 2023

(54) RESPONSE METHOD, APPARATUS AND TERMINAL TO A CONTROL

(71) Applicant: NETEASE (HANGZHOU) NETWORK CO., LTD., Zhejiang (CN)

(72) Inventor: Jin Ge, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 0 days.

(21) Appl. No.: 16/975,407

(22) PCT Filed: Jan. 29, 2019

(86) PCT No.: PCT/CN2019/073712
§ 371 (c)(1),
(2) Date: Aug. 25, 2020

(87) PCT Pub. No.: WO2019/179245
PCT Pub. Date: Sep. 26, 2019

(65) Prior Publication Data
US 2021/0008450 A1     Jan. 14, 2021

(30) Foreign Application Priority Data

Mar. 23, 2018   (CN) .......................... 201810245888.3

(51) Int. Cl.
*A63F 13/42*     (2014.01)
*A63F 13/2145*   (2014.01)
(Continued)

(52) U.S. Cl.
CPC .......... *A63F 13/42* (2014.09); *A63F 13/2145* (2014.09); *A63F 13/45* (2014.09);
(Continued)

(58) Field of Classification Search
CPC ...... A63F 13/42; A63F 13/2145; A63F 13/45; A63F 13/533; A63F 13/55;
(Continued)

(56) References Cited

U.S. PATENT DOCUMENTS

2005/0227762 A1* 10/2005 Tahara ................... A63F 13/26
463/30
2010/0302238 A1* 12/2010 Yonemori ............... A63F 13/10
345/419
(Continued)

FOREIGN PATENT DOCUMENTS

CN      103576966 A     2/2014
CN      105727553 A     7/2016
(Continued)

OTHER PUBLICATIONS

How do I run? Gamefaqs.com. Online. 2009. Accessed via the Internet. Accessed Aug. 26, 2021. <URL: https://gamefaqs.gamespot.com/ps/197341-final-fantasy-vii/answers/72722-how-do-i-run> (Year: 2009).*

*Primary Examiner* — Thomas J Hong
*Assistant Examiner* — Carl V Larsen
(74) *Attorney, Agent, or Firm* — Gang Yu

(57) ABSTRACT

Disclosed are a control response method and apparatus, and a terminal. The method is applied to a touch control terminal capable of presenting a graphical user interface, including: providing a first control on a graphical user interface, the operation response region of the first control including a first control region and a first response region; providing a second touch region on a graphical user interface, wherein the second touch region at least partially overlaps with the first response region; detecting a first touch operation acting on an overlap region of the second touch region and the first response region; determining an operation instruction generated in response to the first touch operation according to
(Continued)

the game parameter, wherein the operation instruction is a first operation instruction corresponding to the first control or a second operation instruction corresponding to the second touch region.

18 Claims, 4 Drawing Sheets

(51) Int. Cl.
    *A63F 13/45*     (2014.01)
    *A63F 13/533*     (2014.01)
    *A63F 13/55*     (2014.01)

(52) U.S. Cl.
    CPC ............ *A63F 13/533* (2014.09); *A63F 13/55* (2014.09); *A63F 2300/1075* (2013.01); *A63F 2300/308* (2013.01)

(58) Field of Classification Search
    CPC ........ A63F 2300/1075; A63F 2300/308; A63F 13/426; A63F 2300/63; A63F 2300/302
    See application file for complete search history.

(56) References Cited

U.S. PATENT DOCUMENTS

| | | | |
|---|---|---|---|
| 2013/0031515 A1* | 1/2013 | Funabashi | G06F 3/04886 |
| | | | 715/863 |
| 2014/0137053 A1 | 5/2014 | Zhang | |
| 2015/0290542 A1 | 10/2015 | Norden | |
| 2017/0075539 A1* | 3/2017 | Borromeo | G06F 3/04842 |
| 2018/0154264 A1* | 6/2018 | Sato | A63F 13/2145 |
| 2018/0353848 A1* | 12/2018 | Takahashi | H03K 17/96 |

FOREIGN PATENT DOCUMENTS

| | | |
|---|---|---|
| CN | 106310659 A | 1/2017 |
| CN | 106938142 A | 7/2017 |
| CN | 107433036 A | 12/2017 |
| CN | 107661630 A | 2/2018 |
| CN | 107704147 A | 2/2018 |
| CN | 108379839 A | 8/2018 |

\* cited by examiner

图4 (a)

RESPONSE METHOD, APPARATUS AND TERMINAL TO A CONTROL

CROSS-REFERENCE TO RELATED APPLICATION

The present application claims benefit of Chinese Patent Application No. 201810245888.3, filed to the China Patent Office on Mar. 23, 2018, entitled "Response Method, Apparatus and Terminal to a Control", the contents of which are hereby incorporated by reference in its entirety.

TECHNICAL FIELD

The present disclosure relates to the field of computers, and in particular, to a method, an apparatus, and a terminal for responding to a control.

BACKGROUND

With the rapid development of computer technology, touch display screens are widely applied to various electronic devices, such as mobile phones, tablets, and wearable devices (e.g., smart wrists, smart watches). Meanwhile, the development of the technology of touching the display screen provides convenience for game players. Currently, in order to improve the game experience of game players, a game developer arranges a plurality of virtual buttons on a touch display screen, and each virtual button has a different function. However, the physical region of the touch display screen is limited, and when the number of the virtual buttons is large, the game interface is crowded, and the response region of the virtual buttons may overlap, which is easy to generate a misoperation and affect the experience of the game player.

At present, the above problem is mainly solved by the following method:

(1) A switching button is provided, and a game player can operate the switching button to display buttons having different functions. As shown in FIG. 1(a) and FIG. 1(b), the buttons displayed by default on the game interface are as shown in FIG. 1(a), that is, the first group of buttons corresponding to 'breaking', 'pendant', 'child', 'transmission', and 'refinement' are displayed by default. After the game player clicks the 'switching' button in FIG. 1(a), the game interface will display the second group of buttons shown in FIG. 1(b), i.e., the game interface will display buttons such as 'auction', 'potential force', 'store', cooker, 'package'. Similarly, after the game player clicks the 'switching' button in FIG. 1(b), the game interface will display the first group of buttons as shown in FIG. 1(a). It can be seen from FIG. 1(a) and FIG. 1(b) that the two groups of buttons cannot be displayed and used simultaneously, and the function display information of the buttons is incomplete. In addition, when the game player needs to use a button, the switching button needs to be operated, and the operation step of the game player is large, and the game experience effect is poor. In addition, the method of setting the switching button forces the level of the button, changes the priority of the button, and brings an inconvenient operation to the game player.

(2) An interaction range of a response region of a plurality of buttons is set, and the priorities of overlapping portions are determined. As shown in FIG. 2, C denotes a response region of the rocker, S denotes a response region of the shooting button, C overlaps with S, and an operation of responding to the shooting button with a priority higher is set, and the priority of S is higher than that of C, that is, when the game player touches the S region, only the shooting instruction is responded. However, when the S region is small, when the game player performs a blind operation, the game player easily clicks the C region and enters the rocker mode. If the S region is large, the game player can easily mistakenly click the shooting button when performing the rocker operation.

(3) The function of the overlap portion is determined by setting different operations, for example, the function of the overlap portion is determined by clicking, pressing, dragging, double clicking. However, the method is inconvenient to memory, and it is necessary for the game player to switch between different operations, and the game experience effect is poor.

In view of the above problem that a misoperation phenomenon on a button tends to occur due to a large number of buttons in a game interface, an effective solution has not been proposed at present.

SUMMARY

Embodiments of the present disclosure provide a method and apparatus for responding to a control, and a terminal, so as to at least solve the technical problem that a misoperation phenomenon on a button tends to occur due to a large number of buttons in a game interface.

According to an embodiment of the present disclosure, there is provided a method for responding to a control, the method being applied to a touch control terminal capable of presenting a graphical user interface, comprising: providing a first control on a graphical user interface, the operation response region of the first control including a first control region and a first response region; providing a second touch region on a graphical user interface, wherein the second touch region at least partially overlaps with the first response region; detecting a first touch operation acting on an overlap region of the second touch region and the first response region; determining an operation instruction generated in response to the first touch operation according to the game parameter, wherein the operation instruction is a first operation instruction corresponding to the first control or a second operation instruction corresponding to the second touch region.

According to an embodiment of the present disclosure, an apparatus for responding to a control is further provided, which is applied to a touch control terminal capable of presenting a graphical user interface, comprising: a first execution module, configured to provide a first control on a graphical user interface, wherein an operation response region of the first control comprises a first control region and a first response region; a second execution module configured to provide a second touch region on the graphical user interface, wherein the second touch region at least partially overlaps with the first response region; a detecting module configured to detect a first touch operation acting on an overlapping region between the second touch region and the first response region; a generating module, configured to determine an operation instruction generated in response to the first touch operation according to the game parameter, wherein the operation instruction is a first operation instruction corresponding to the first control or a second operation instruction corresponding to the second touch region.

According to an embodiment of the present disclosure, a terminal for determining a control response region is further provided, including: a display; a processor, the processor executing a program, wherein the program executes the following processing steps on data output from the display when the program executes: providing a first control on a graphical user interface, the operation response region of the first control including a first control region and a first response region; providing a second touch region on a graphical user interface, wherein the second touch region at least partially overlaps with the first response region; detecting a first touch operation acting on an overlap region of the second touch region and the first response region; determining an operation instruction generated in response to the first touch operation according to the game parameter, wherein the operation instruction is a first operation instruction corresponding to the first control or a second operation instruction corresponding to the second touch region.

According to an embodiment of the present disclosure, there is further provided a storage medium including a stored program, wherein the program executes a response method of a control.

According to an embodiment of the present disclosure, a processor is further provided, and the processor is configured to run a program, wherein the program runs a response method of a control.

In the embodiment of the present disclosure, in a manner of allocating an overlap region of a response region according to a game scenario, a first control is provided on a graphical user interface, a second touch region is provided on an image user interface, and then a first touch operation acting on the overlap region of the second touch region and the first response region is detected. and determining an operation instruction generated in response to the first touch operation according to the game parameter, wherein the operation response region of the first control includes a first control region and a first response region, the second touch region overlaps at least part of the first response region, and the operation instruction is a first operation instruction corresponding to the first control; or the second operation instruction corresponding to the second touch region achieves the purpose of optimizing the game interface, thereby achieving the technical effect of reducing the misoperation of the button, and further solving the technical problem that the misoperation phenomenon of the button tends to occur due to the large number of buttons in the game interface.

BRIEF DESCRIPTION OF THE DRAWINGS

The accompanying drawings described herein are used to provide a further understanding of the present disclosure and form a part of the present disclosure, and the schematic embodiments of the present disclosure and the description thereof are used to explain the present disclosure and are not intended to limit the present disclosure. In the drawings.

DETAILED DESCRIPTION OF THE EMBODIMENTS

In order to make those skilled in the art better understand the technical solutions of the present disclosure, the technical solutions in the embodiments of the present disclosure will be clearly and completely described below with reference to the accompanying drawings in the embodiments of the present disclosure. Apparently, the described embodiments are merely a part of the embodiments of the present disclosure, rather than all of the embodiments. Based on the embodiments of the present disclosure, all other embodiments obtained by those skilled in the art without creative efforts should belong to the scope of protection of the present disclosure.

It should be noted that the terms "first," "second," and the like in the description and claims of the present disclosure and the figures described above are used to distinguish similar objects, and do not have to be used to describe a specific order or a precedence order. It should be understood that the data so used may be interchanged where appropriate, such that the embodiments of the present disclosure described herein may be implemented in an order other than those illustrated or described herein. Moreover, the terms "comprising" and "having" and any variation thereof, are intended to cover not exclusively including, for example, processes, methods, systems, products or apparatuses comprising a series of steps or units are not necessarily limited to those steps or units that are clearly listed. Instead, other steps or units not expressly listed or inherent to these processes, methods, products or devices may be included.

Example 1

According to an embodiment of the present disclosure, an embodiment of a method for responding to a control is provided, and it should be noted that the steps illustrated in the flowcharts of the drawings may be performed in a computer system such as a set of computer-executable instructions, and, although a logical order is illustrated in the flowcharts, in some cases, the steps illustrated or described may be performed in an order different from that herein.

Figure 1:
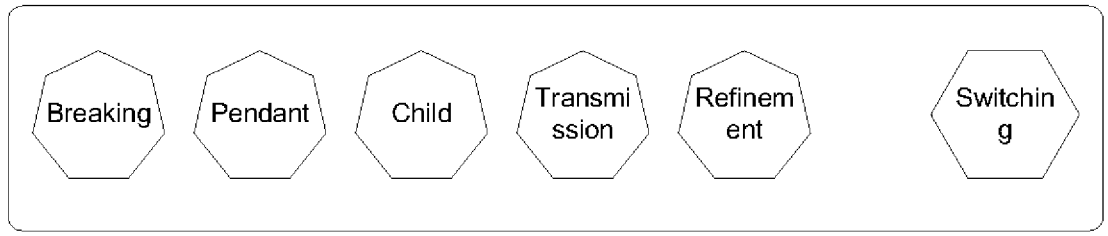
FIG. 1(a) is a schematic diagram showing an optional game button according to the prior art.
FIG. 1(b) is a schematic diagram showing an optional game button according to the prior art.
Figure 1:
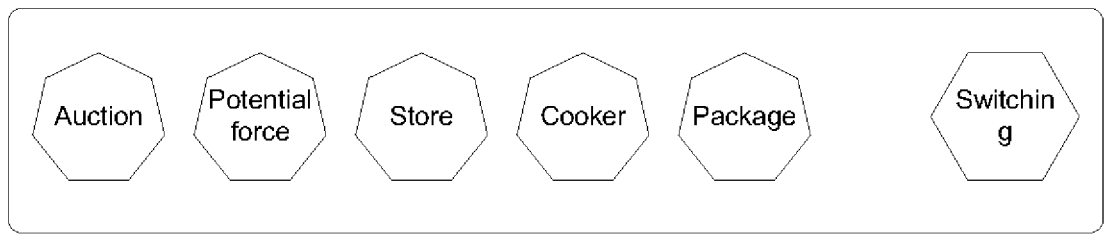
Figure 2:
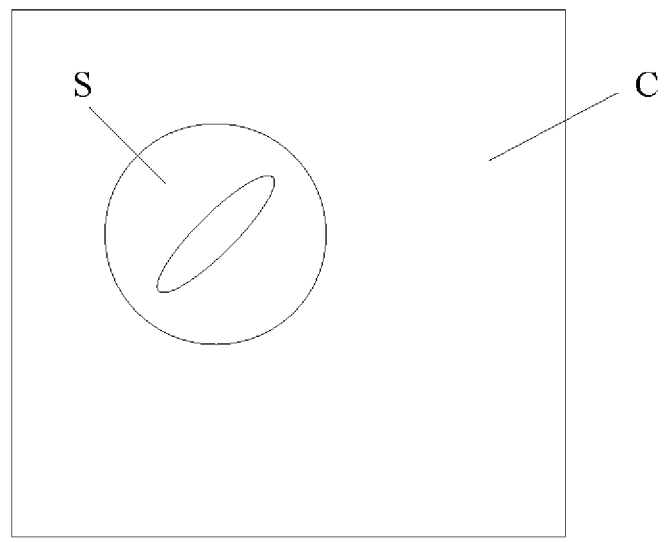
FIG. 2 is a schematic diagram showing an optional game button according to the prior art.
Figure 3:
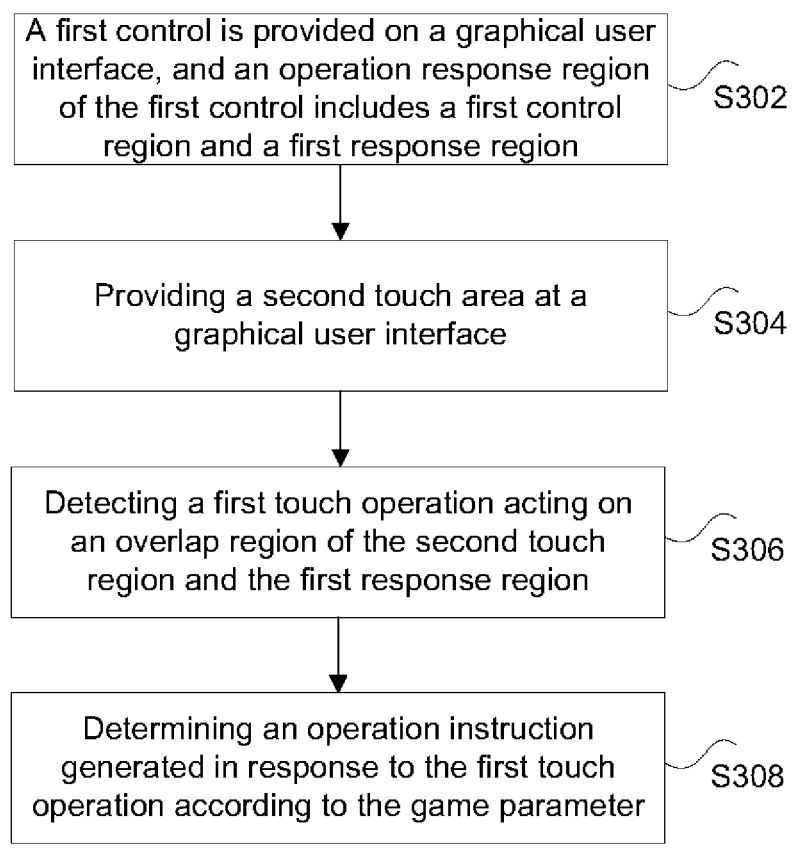
FIG. 3 is a flowchart of a response method of a control according to an embodiment of the present disclosure.

FIG. 3 is a flowchart of a response method of a control according to an embodiment of the present disclosure, wherein the method is applicable to a touch control terminal that may present a graphical user interface. As shown in FIG. 3, the method includes the following steps:

In step S302, a first control is provided on a graphical user interface, and an operation response region of the first control includes a first control region and a first response region.

Figure 4:
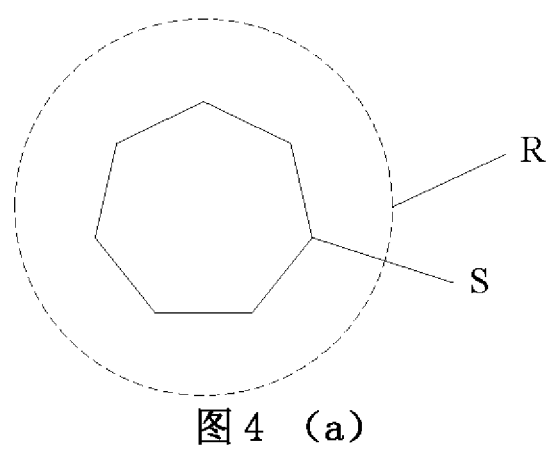
FIG. 4(a) is a schematic diagram showing an optional first control according to an embodiment of the present disclosure.
FIG. 4(b) is a schematic diagram of display of an optional second touch region according to an embodiment of the present disclosure.
Figure 4:
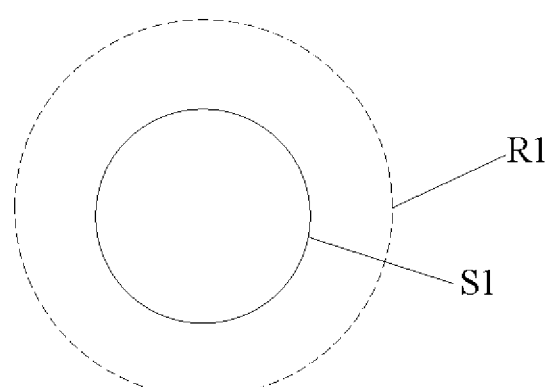

In the present exemplary embodiment, the graphical user interface of the touch terminal may display a first control, where the touch terminal is a terminal having a display function, for example, a mobile phone, a tablet, a computer, and the like. In addition, FIG. 4(a) is a schematic diagram of an optional first control, and in FIG. 4(a), the first control region is S and the first response region is R.

Further, in the present exemplary embodiment, in order to ensure that an accurate response can be obtained when the game player clicks the first control, the first response region R is provided around the first control region S, wherein the area of the first control region S is not larger than the area of the first response region R.

Step S304: a second touch region on the graphical user interface is provided, wherein the second touch region at least partially overlaps with the first response region.

Figure 5:
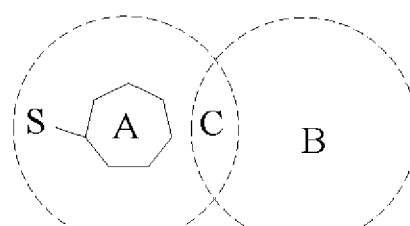
FIG. 5(a) is a schematic diagram of a positional relationship between an optional first control and a second touch region according to an embodiment of the present disclosure.
FIG. 5(b) is a schematic diagram of a positional relationship between an optional first control and a second touch region according to an embodiment of the present disclosure.
FIG. 5(c) is a schematic diagram of a positional relationship between an optional first control and a second touch region according to an embodiment of the present disclosure.
Figure 5:
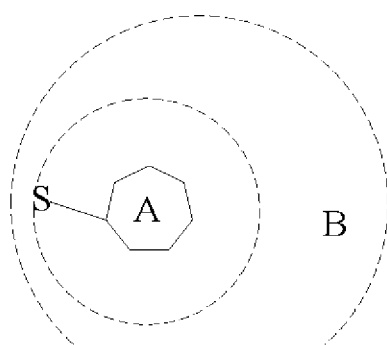
Figure 5:
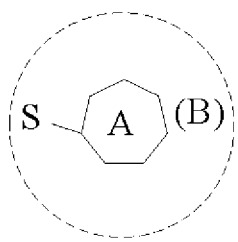

In the present exemplary embodiment, the second touch response region may be an region having a visual indication effect in the graphical user interface, or an region not having a visual indication effect, or an operation region in which an operation control such as a virtual rocker or a direction control virtual key is displayed in the second touch response region, which is not limited in the present exemplary embodiment. In an optional embodiment, FIG. 5(a)-FIG. 5(c) illustrate an optional positional relationship between a first control and a second touch region. FIGS. 5(a) and 5(b) show that the second touch region B partially overlaps with the first response region of the first control A, and FIG. 5(c) shows that the second touch region B overlaps with the first response region of the first control A. In FIG. 5(a), the second touch region B intersects with the first response region of the first control A, and in FIG. 5(b), the second touch region B includes the first response region of the first control A.

In an exemplary embodiment, as shown in FIG. 4(b), the second touch region may further include a second control region S1 and a second response region R1, and the second control is displayed in the second control region S1, that is, an area of the second control region S1 of the second touch region is not larger than an area of the second response region R1. In the present embodiment, the second touch region at least partially overlaps with the first response region, and the second touch region at least partially overlaps with the first response region R.

Step S306, a first touch operation acting on an overlap region of the second touch region and the first response region is detected.

In the present exemplary embodiment, the touch control terminal determines the overlap region according to the positional relationship between the first response region R and the second touch region B of the first control, and detects in real time whether the operation of the game player in the touch control overlap region is received; In other embodiments, the touch terminal detects the first touch operation acting on the overlap region of the second response region R1 and the first response region R, that is, the touch terminal determines the overlap region according to the positional relationship between the first response region R of the first control A and the second response region R1 of the second touch region B. and detecting in real time whether an operation of touching the overlap region of the game player is received, for example, when the game player touches the overlap region while playing the game, the touch terminal determines that the user has generated the first touch operation.

In step S308, an operation instruction generated in response to the first touch operation is determined according to the game parameter, where the operation instruction is a first operation instruction corresponding to the first control or a second operation instruction corresponding to the second touch region.

In the present exemplary embodiment, the game parameter includes at least one of: a progress of a game, an action of a virtual character, a parameter of a game device corresponding to the virtual character, and a game instruction. The progress of the game may be a task executed by the game player, for example, the game player needs to complete three tasks, and the second task is being executed; The progress of the game may also be a specific stage in which the game player is executing a task, for example, the first task game player needs to destroy two bursts, kills 20 enemies, and hits ten aircrafts; if the game player has destroyed two bursts at this time, hits ten aircrafts, and kills four enemies, the progress of the game is a stage of killing the enemy. In addition, when the virtual character in the game is a virtual character operated by the game player in the game, the motion of the virtual character in the game may be, but is not limited to, shooting, running, upper bullet, bedding, etc. The parameter of the game device corresponding to the virtual character may be, but is not limited to, the number of bullets remaining in the gun, the number of gardens, and the game instruction may be, but is not limited to, an instruction (e.g., a shooting instruction and a running instruction) input by the game player through an external input device (e.g., a mouse, a keyboard, a virtual button on a screen, etc.).

In an optional embodiment, the first operation instruction is an instruction for controlling a virtual character in a game to complete some functions, for example, a shooting action; The second operation instruction is an instruction for controlling the virtual character in the game to complete some basic actions, such as running and jumping. Specifically, the touch control terminal determines that the game player is executing the second task, and in this task, the game player needs to extinguish 10 enemies in the region 1, and then extinguish 5 enemies in the region 2, at this time, the game player has extinguished 10 enemies in the region 1, and is moving to the region 2. Then, the touch control terminal determines that the current game scene is a running scene, and determines that an instruction of a first touch operation performed by the game player on the overlap region is a second operation instruction. When the game player enters the region 2, the game player starts to execute a task, and at this time, the touch control terminal determines that the current game scene is a shooting scene, and determines that the game player's instruction to perform the first touch control operation on the overlap region is the first operation instruction.

Based on the steps defined in Step S302 to Step S308, it can be learn that the first control is provided on the graphical user interface and the second touch region is provided on the graphical user interface, and then the first touch operation acting on the overlap region of the second touch region and the first response region is detected. and determining an operation instruction generated in response to the first touch operation according to the game parameter, wherein the operation response region of the first control includes a first control region and a first response region, the second touch region overlaps at least part of the first response region, and the operation instruction is a first operation instruction corresponding to the first control; or a second operation instruction corresponding to the second touch region.

It is easily noted that since the first response region and the second touch region of the first control overlap, the space of the game interface can be saved compared with the display interface in which the first control and the second touch region do not overlap. After the overlap region is obtained, the overlap region is determined based on different game parameters. Since the use frequencies of the users for different controls are different under different game parameters, the priority of the game controls can be determined according to the current game parameters, and the overlap region is assigned to the higher priority controls, thereby achieving the purpose of reducing the misoperation of the controls.

It can be seen that the embodiments provided by the present disclosure can achieve the purpose of optimizing the game interface, thereby achieving the technical effect of reducing the misoperation of the button, and further solving the technical problem that the misoperation phenomenon of the button tends to occur due to the large number of buttons in the game interface.

In an optional embodiment, the touch control terminal may further detect a second touch operation acting on the first control region, and generate a first operation instruction corresponding to the first control in response to the second touch operation. Specifically, as shown in FIG. 4(a), the response region of the first control A includes the first control region S and the first response region R. And the area the first control region S of the first control is smaller than the first response region R of the first control A, and the first control region S is located in the non-overlap region. When the game player operates in the first control region S, the touch control terminal may determine that the second touch control operation of the game player is only for the first control, and therefore, the touch control terminal responds to the first operation instruction corresponding to the first control.

In an optional embodiment, the touch control terminal may further detect a third touch operation acting on the second control region S1, and generate a second operation instruction corresponding to the second control in response to the third touch operation. Specifically, FIG. 4(b) is taken as an example for description. In FIG. 4(b), the second touch region B includes a second control region S1 and a second response region R1, and the second control is displayed in the second control region S1. As the area of the second control region S1 is smaller than the second response region R1, and the second control region S1 is located in the non-overlapping region, when the game player operates in the non-overlapping portion (second control region S1) in the second touch region, the touch terminal may determine that the third touch operation of the game player is only for the second control, and therefore, the touch terminal responds to the second operation instruction corresponding to the second touch region. In the present exemplary embodiment, after detecting the first touch operation acting on the overlap region, the touch terminal determines an operation instruction generated in response to the first touch operation according to the game parameter, and the specific steps are as follows:

In step S3080, when the game parameter satisfies the first preset condition, a first operation instruction corresponding to the first control is generated in response to the first touch operation;

In step S3082, when the game parameter satisfies the second preset condition, a second operation instruction corresponding to the second control is generated in response to the first touch operation.

In an optional embodiment, the game parameter may be a parameter of the game device corresponding to the virtual character, for example, the number of bullets remaining in the gun is greater than a preset number, for example, the number of bullets is greater than 0, and when the game player touches the overlap region, the touch terminal responds to the first operation instruction corresponding to the first control, for example, the shooting instruction. If the number of bullets remaining in the gun is less than or equal to the preset number, for example, the number of bullets is 0, when the game player touches the overlap region, the touch terminal responds to the second operation instruction corresponding to the second control, for example, controls the virtual character to execute the running instruction.

It can be seen that the operation instructions of the overlap region are determined according to the game parameters, so that the misoperation of the game player can be effectively avoided, and the operation of the game player is simple, no additional memory needs to be performed on the function of the control, thereby the game experience of the game player is improved.

In another optional embodiment, the game parameter may also be a particular game instruction detected (e.g., a trigger instruction for a particular touch region). For example, a third touch region is provided, and if a trigger instruction of the third touch region is detected, a first operation instruction corresponding to the first control is generated in response to the first touch operation; If the trigger instruction of the third touch region is not detected, the second operation instruction corresponding to the second control is generated in response to the first touch operation. Or, if the trigger instruction of the third touch region is not detected, a first operation instruction corresponding to the first control is generated in response to the first touch operation; and if a trigger instruction of the third touch region is detected, a second operation instruction corresponding to the second control is generated in response to the first touch operation.

Specifically, after detecting the first touch operation acting on the overlap region and the first touch operation, the touch control terminal may further determine an operation instruction generated in response to the first touch operation by executing the following steps, and the specific steps are as follows:

Step S3084: a third touch region on a graphical user interface is providing;

Step S3086, when detecting the first touch operation acting on the overlap region of the second touch region and the first response region, it is determined that whether a game instruction generated in response to the fourth touch operation acting on the third touch region is received;

In step S3088, when the game instruction is received, the operation instruction generated in response to the first touch operation is determined.

In the present exemplary embodiment, the third touch region and the overlap region of the second touch region and the first response region are provided at different sides of the graphical user interface. For example, the overlap region is located on the left side of the graphical user interface, and correspondingly, the third touch region is located on the right side of the graphical user interface.

In a specific embodiment of the present disclosure, a first control is as a shooting control, a second touch control region is as a movement control region, and a third control region is as an aiming control region, wherein a response region of the shooting control overlaps with the movement control region.

When a first touch operation acting on an overlap region of the movement control region and the response region of the shooting control is detected, it is determined that whether a game instruction generated in response to a fourth touch operation acting on an aiming control region is received, wherein the first touch operation may be at least one of a click, a repress, a long press, and a slide operation, and the fourth touch operation may be at least one of a click, a repress, a long press, and a slide operation; When the game instruction is received, an operation instruction generated in response to the first touch operation is determined. The manifestations in the game are: If the right hand of the game player operates the sighting control region, that is, the third touch control region, and the left hand touches the overlap region, the touch control terminal determines that the overlap region between the first control and the second touch control region responds to the first operation instruction corresponding to the first control, that is, the overlap region responds to the shooting instruction, and the virtual character is controlled to execute the shooting operation; If the game player does not operate the sighting control region, the touch control terminal determines that the overlapped region of the first control and the second touch control region responds to the second operation instruction corresponding to the second touch control region, that is, the overlapped region responds to the movement instruction, and the virtual character is controlled to execute the movement operation in the game scene.

In another specific embodiment of the present disclosure, the touch terminal may determine an operation instruction generated in response to the first touch operation according to the action type of the virtual character, and the specific steps are as follows:

Step S4020, a motion type of a virtual character is detected;

Step S4022, an operation instruction generated in response to the first touch operation is determined according to the action type of the virtual character.

Taking the first control as a shooting control and the second touch control region as an aiming control region as an example, the response region of the shooting control coincides with the aiming control region. The touch control terminal detects that the virtual character in the game is running (for example, when the automatic running function is turned on), and when the game player touches the overlap region between the response region of the shooting control and the sighting control region, the touch control terminal determines that the overlap region responds to the shooting instruction corresponding to the shooting control. If the virtual character in the game is standing, the touch terminal determines that the overlap region responds to the aiming instruction corresponding to the aiming control region when the game player touches the overlap region between the response region of the shooting control and the aiming control region.

In the present exemplary embodiment, after the operation instruction responded to the overlap region is determined, the display region of the first control and the display region of the second touch region do not change, but the response region of the first control and the response region of the second touch region are different according to the determination of the overlap region.

Example 2

Figure 6:
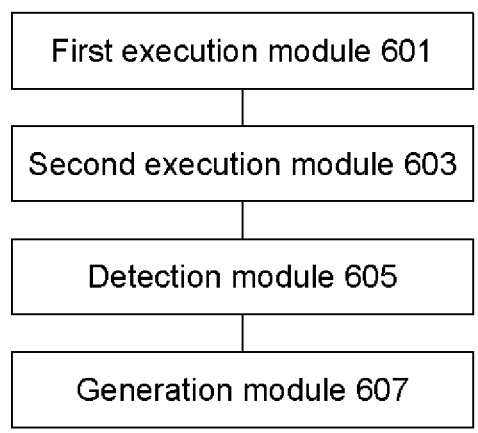
FIG. 6 is a schematic structural diagram of a response device of a control according to an embodiment of the present disclosure.

According to an embodiment of the present disclosure, an embodiment of an apparatus for responding to a control is further provided, where the apparatus is applicable to a touch control terminal capable of presenting a graphical user interface, and FIG. 6 is a schematic structural diagram of an apparatus for responding to a control according to an embodiment of the present disclosure. As shown in FIG. 6, the apparatus includes: a first execution module 601, a second execution module 603, a detection module 605 and a generation module 607.

The first execution module 601 is configured to provide a first control on a graphical user interface, where an operation response region of the first control includes a first control region and a first response region; a second execution module 603, configured to provide a second touch region on the graphical user interface, wherein the second touch region at least partially overlaps with the first response region; a detecting module 605, configured to detect a first touch operation acting on an overlapping region between the second touch region and the first response region; The generating module 607 is configured to determine an operation instruction generated in response to the first touch operation according to the game parameter, where the operation instruction is a first operation instruction corresponding to the first control or a second operation instruction corresponding to the second touch region.

It should be noted that the first executing module 601, the second executing module 603, the detecting module 605 and the generating module 607 correspond to step S302 to step S308 in Embodiment 1, and the four modules are the same as the examples and application scenarios implemented in the corresponding steps, but are not limited to the contents disclosed in Embodiment 1.

In an optional embodiment, the response apparatus of the control includes: a first detection module and a first response module. wherein the first detecting module is configured to detect a second touch operation acting on the first control region; and a first responding module, configured to generate a first operation instruction corresponding to the first control in response to the second touch operation.

It should be noted that, the second touch region and the first response region at least partially overlap each other includes: The second touch region includes a second control region and a second response region, and the second control is displayed in the second control region, and the second response region at least partially overlaps with the first response region.

In an optional embodiment, the apparatus for responding to a control further includes: a second detection module and a second response module. wherein the second detecting module is configured to detect a third touch operation acting on the second control region; and a second responding module, configured to generate a second operation instruction corresponding to the second control in response to the third touch operation.

In an optional embodiment, the detecting module includes: a third detection module. The third detecting module is configured to detect a first touch operation acting on an overlapping region between the second response region and the first response region.

In an optional embodiment, the generating module includes: a third response module and a fourth response module. wherein the third response module is configured to generate a first operation instruction corresponding to the first control in response to the first touch operation when the game parameter satisfies the first preset condition; and a fourth response module, configured to generate a second operation instruction corresponding to the second control in response to the first touch operation when the game parameter satisfies the second preset condition.

It should be noted that the third response module and the fourth response module correspond to step S3080 to step S3082 in Embodiment 1, and the two modules are the same as the examples and application scenarios implemented in the corresponding steps, but are not limited to the contents disclosed in Embodiment 1.

In addition, it should be noted that the first response region is disposed around the first control region. The game parameter includes at least one of the following: a progress of a game, an action of a virtual character, a parameter of a game device corresponding to the virtual character, and a game instruction.

In an optional embodiment, the generating module includes: a third execution module, a judgment module and a first generation module. wherein the third execution module is configured to provide the third touch region on the graphical user interface; a judgment module configured to judge whether a game instruction generated in response to a fourth touch operation acting on the third touch region is received when a first touch operation acting on an overlapping region between the second touch region and the first response region is detected; a first generating module, configured to determine an operation instruction generated in response to the first touch operation when the game instruction is received.

It should be noted that the third execution module, the judgment module and the first generation module correspond to step S3084 to step S3086 in Embodiment 1, and the three modules are the same as the examples and application scenarios implemented in the corresponding steps, but are not limited to the contents disclosed in Embodiment 1.

In an optional embodiment, the generating module includes: a fourth detection module and a second generation module. wherein the fourth detecting module is configured to detect a motion type of the virtual character; a second generating module, configured to determine an operation instruction generated in response to the first touch operation according to the motion type of the virtual character.

It should be noted that, the fourth detecting module and the second generating module correspond to step S4020 to step S4022 in Embodiment 1, and the two modules are the same as the examples and application scenarios implemented in the corresponding steps, but are not limited to the contents disclosed in Embodiment 1.

Example 3

According to an embodiment of the present disclosure, a terminal embodiment for determining a control response region is further provided, wherein the terminal comprises: a display and a processor. wherein the processor runs the program, wherein the program runtime performs the following processing steps on the data output from the display: providing a first control on a graphical user interface, the operation response region of the first control including a first control region and a first response region; providing a second touch region on a graphical user interface, wherein the second touch region at least partially overlaps with the first response region; detecting a first touch operation acting on an overlap region of the second touch region and the first response region; determining an operation instruction generated in response to the first touch operation according to the game parameter, wherein the operation instruction is a first operation instruction corresponding to the first control or a second operation instruction corresponding to the second touch region.

Optionally, the processor is further configured to detect a second touch operation acting on the first control region; and generating a first operation instruction corresponding to the first control in response to the second touch operation.

It should be noted that, the second touch region and the first response region at least partially overlap each other includes: The second touch region includes a second control region and a second response region, and the second control is displayed in the second control region, and the second response region at least partially overlaps with the first response region.

Optionally, the processor is further configured to detect a third touch operation acting on the second control region; and generating a second operation instruction corresponding to the second control in response to the third touch operation.

Optionally, the processor is further configured to detect a first touch operation acting on an overlapping region between the second response region and the first response region.

Optionally, the processor is further configured to, when the game parameter satisfies the first preset condition, generate a first operation instruction corresponding to the first control in response to the first touch operation; When the game parameter satisfies the second preset condition, a second operation instruction corresponding to the second control is generated in response to the first touch operation.

It should be noted that the first response region is disposed around the first control region. The game parameter includes at least one of the following: a progress of a game, an action of a virtual character, a parameter of a game device corresponding to the virtual character, and a game instruction.

Optionally, the processor is further configured to provide a third touch region on the graphical user interface; determining whether a game instruction generated in response to a fourth touch operation applied to the third touch region is received when a first touch operation applied to an overlap region between the second touch region and the first response region is detected; When the game instruction is received, an operation instruction generated in response to the first touch operation is determined.

Optionally, the processor is further configured to detect a motion type of the virtual character; and determining an operation instruction generated in response to the first touch operation according to the motion type of the virtual character.

Example 4

According to one embodiment of the present disclosure, there is further provided a storage medium including a stored program, wherein the program executes the response method of the control in Embodiment 1.

Embodiment 5

According to one embodiment of the present disclosure, there is further provided a processor configured to run a program, wherein the program runs and executes a response method of a control in Embodiment 1.

The serial numbers of the embodiments of the present disclosure are merely for description, and do not represent the advantages and disadvantages of the embodiments.

In said embodiments of the present disclosure, the description of each embodiment has a side weight, and some embodiments are not described in detail, and reference may be made to relevant description of other embodiments.

In several embodiments provided by the present disclosure, it should be understood that the disclosed technology may be implemented in other ways. The apparatus embodiments described above are merely schematic, for example, the division of the units may be a logical function division, and there may be another division manner in actual implementation, for example, a plurality of units or components may be combined or integrated into another system, or some features may be ignored or not performed. In another point, the displayed or discussed coupling or direct coupling or communication connection to one another may be through some interfaces, indirect coupling or communication connections of units or modules, and may be electrical or other forms.

The units described as separate components may or may not be physically separate, and the components displayed as units may or may not be physical units, that is, may be located in one place, or may be distributed to a plurality of units. Some or all of the units may be selected according to actual needs to achieve the purpose of the solution of the present embodiment.

In addition, each functional unit in each embodiment of the present disclosure may be integrated in one processing unit, or each unit may be physically present separately, or two or more units may be integrated in one unit. The integrated units may be implemented in the form of hardware or in the form of software functional units.

The integrated unit may be stored in a computer-readable storage medium if implemented in the form of a software functional unit and sold or used as an independent product. Based on such understanding, the technical solutions of the present disclosure essentially or in part contributing to the prior art or all or part of the technical solutions may be embodied in the form of a software product, and the computer software product is stored in a storage medium. Several instructions are included to cause a computer device (which may be a personal computer, a server, or a network device, etc.) to perform all or part of the steps of the methods described in various embodiments of the present disclosure. The storage medium includes: a U disk, a read-only memory (ROM), a random access memory (RAM), a mobile hard disk, a magnetic disk, or an optical disk, and the like.

The above description is merely a preferred embodiment of the present disclosure, and it should be pointed out that a person of ordinary skill in the art can make several improvements and modifications without departing from the principle of the present disclosure, and these improvements and modifications should also be considered as the scope of protection of the present disclosure.

INDUSTRIAL APPLICABILITY

The solutions provided by the embodiments of the present application can be applied to a network game, and an overlapping region of a response region is allocated according to a game scenario, so as to optimize a game interface, thereby solving the problem that a misoperation phenomenon on a button tends to occur due to a large number of buttons in the game interface, and achieving the technical effect of reducing the misoperation on the button.

What is claimed is:

1. A method for responding to a control, applied to a touch control terminal capable of presenting a graphical user interface, comprising:
providing a first control on the graphical user interface, an operation response region of the first control comprising a first control region and a first response region;
providing a second touch region on the graphical user interface, wherein the second touch region at least partially overlaps with the first response region;
detecting a first touch operation acting on an overlap region of the second touch region and the first response region;
in response to the first touch operation, generating an operation instruction according to a game parameter;
wherein generating the operation instruction according to the game parameter comprises:
determining a priority of the first control and a priority of the second touch region according to the game parameter, generating the operation instruction according to the priority of first control and the priority of the second touch region, the operation instruction is a first operation instruction corresponding to the first control or a second operation instruction corresponding to the second touch region, the first operation instruction is used for controlling a virtual character in a game to complete an action corresponding to the first control, and the second operation instruction is used for controlling the virtual character to complete an action corresponding to the second touch region;
wherein generating the operation instruction according to the priority of the first control and the priority of the second touch region comprises:
in response to the priority of the first control is higher than the priority of the second touch region, generating the first operation instruction corresponding to the first control; and in response to the priority of the second touch region is higher than the priority of the first control, generating the second operation instruction corresponding to the second touch region.

2. The method as claimed in claim 1, wherein the method further comprises:
detecting a second touch operation acting on the first control region;
in response to the second touch operation, generating the first operation instruction corresponding to the first control.

3. The method as claimed in claim 1, wherein the second touch region at least partially overlaps with the first response region, comprising:
the second touch region comprises a second control region and a second response region, displaying a second control on the second control region, wherein the second response region at least partially overlaps with the first response region.

4. The method as claimed in claim 3, wherein the method further comprises:
detecting a third touch operation acting on the second control region;
in response to the third touch operation, generating the second operation instruction corresponding to the second control.

5. The method as claimed in claim 3, wherein the detecting the first touch operation acting on the overlap region of the second touch region and the first response region comprises:
detecting the first touch operation acting on an overlap region between the second response region and the first response region.

6. The method as claimed in claim 5, wherein the determining the operation instruction generated in response to the first touch operation according to the game parameter comprises:

if the game parameter satisfies a first preset condition, in response to the first touch operation, generating the first operation instruction corresponding to the first control; and if the game parameter satisfies a second preset condition, in response to the first touch operation, generating the second operation instruction corresponding to the second control.

7. The method as claimed in claim 1, wherein the first response region is disposed around the first control region.

8. The method as claimed in claim 1, wherein the game parameter comprises at least one of: a progress of a game, an action of a virtual character, a parameter of a game device corresponding to the virtual character, and a game instruction.

9. The method as claimed in claim 8, wherein in response to the first touch operation, generating the an operation instruction generated according to the game parameter comprises:
providing a third touch region on the graphical user interface;
if the first touch operation applied to the overlap region of the second touch region and the first response region is detected, determining whether the game instruction generated in response to a fourth touch operation applied to the third touch region is received;
if the game instruction is received, generating the operation instruction in response to the first touch operation.

10. The method as claimed in claim 8, wherein in response to the first touch operation, generating the operation instruction according to a game parameter comprises:
detecting a motion type of the virtual character;
in response to the first touch operation, determining the operation instruction according to the motion type of the virtual character.

11. A storage medium comprising a stored program, wherein the program executes the response method of the control as claimed in claim 1.

12. A processor, wherein the processor is configured to run a program, and the program runs to execute the response method of the control as claimed in claim 1.

13. The method as claimed in claim 1, wherein the second touch region at least comprises a second control region, and the second control region is configured to display a second control on the second control region.

14. The method as claimed in claim 13, wherein the determining the operation instruction generated in response to the first touch operation according to the game parameter comprises:
when the game parameter satisfies a first preset condition, in response to the first touch operation, generating the first operation instruction corresponding to the first control; and
when the game parameter satisfies a second preset condition, in response to the first touch operation, generating the second operation instruction corresponding to the second control.

15. The method as claimed in claim 14, wherein when the game parameter satisfies the first preset condition, in response to the first touch operation, generating the first operation instruction corresponding to the first control comprises:
when a parameter of the game device corresponding to the virtual character satisfies the first preset condition, in response to the first touch operation, generating the first operation instruction corresponding to the first control;
when the parameter of the game device satisfies the second preset condition, in response to the first touch operation, generating the second operation instruction corresponding to the second control.

16. The method as claimed in claim 14, wherein when the game parameter satisfies the first preset condition, in response to the first touch operation, generating the first operation instruction corresponding to the first control comprises:
when a trigger instruction of a particular touch region is detected, in response to the first touch operation, generating the first operation instruction corresponding to the first control;
when the trigger instruction of the particular touch region is not detected, in response to the first touch operation, generating the second operation instruction corresponding to the second control.

17. The method as claimed in claim 14, wherein when the game parameter satisfies the first preset condition, in response to the first touch operation, generating the first operation instruction corresponding to the first control comprises:
when a trigger instruction of a particular touch region is not detected, in response to the first touch operation, generating the first operation instruction corresponding to the first control;
when the trigger instruction of the particular touch region is detected, in response to the first touch operation, generating the second operation instruction corresponding to the second control.

18. A terminal for determining a control response region, comprising:
a display;
a processor running a program, wherein the program running time performs the following processing steps on data output from the display:
providing a first control on the graphical user interface, an operation response region of the first control comprising a first control region and a first response region;
providing a second touch region on the graphical user interface, wherein the second touch region at least partially overlaps with the first response region;
detecting a first touch operation acting on an overlap region of the second touch region and the first response region;
in response to the first touch operation, generating an operation instruction according to a game parameter;
wherein generating the operation instruction according to the game parameter comprises:
determining a priority of the first control and a priority of the second touch region according to the game parameter, generating the operation instruction according to the priority of first control and the priority of the second touch region, the operation instruction is a first operation instruction corresponding to the first control or a second operation instruction corresponding to the second touch region, the first operation instruction is used for controlling a virtual character in a game to complete an action corresponding to the first control, and the second operation instruction is used for controlling the virtual character to complete an action corresponding to the second touch region;
wherein generating the operation instruction according to the priority of the first control and the priority of the second touch region comprises:
in response to the priority of the first control is higher than the priority of the second touch region, generating the first operation instruction corresponding to the first control; and in response to the priority of the second touch region is higher than the priority of the first control, generating the second operation instruction corresponding to the second touch region.

\* \* \* \* \*